United States Patent
Wang et al.

(10) Patent No.: US 11,515,777 B2
(45) Date of Patent: Nov. 29, 2022

(54) CASCADED CONVERSION SYSTEM AND VOLTAGE EQUALIZING CONTROL METHOD THEREOF

(71) Applicant: Delta Electronics (Shanghai) Co., Ltd., Shanghai (CN)

(72) Inventors: Xin Wang, Shanghai (CN); Dehai Lou, Shanghai (CN); Lifeng Qiao, Shanghai (CN); Teng Liu, Shanghai (CN); Weibo Qin, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/465,434

(22) Filed: Sep. 2, 2021

(65) Prior Publication Data

US 2022/0094257 A1  Mar. 24, 2022

(30) Foreign Application Priority Data

Sep. 21, 2020 (CN) .......................... 202010995551.1

(51) Int. Cl.
*H02M 1/00* (2006.01)
*H02M 3/158* (2006.01)

(52) U.S. Cl.
CPC ......... *H02M 1/007* (2021.05); *H02M 3/1584* (2013.01)

(58) Field of Classification Search
CPC .............................. H02M 1/00; H02M 3/158
See application file for complete search history.

(56) References Cited

U.S. PATENT DOCUMENTS

| | | | |
|---|---|---|---|
| 11,251,628 B2* | 2/2022 | Peretz | ..................... H02J 7/345 |
| 2005/0284673 A1 | 12/2005 | Nakazawa et al. | |
| 2017/0085183 A1* | 3/2017 | Notsch | ..................... H02M 1/44 |
| 2020/0195144 A1* | 6/2020 | Gekinozu | ........... H02M 3/3376 |
| 2020/0251985 A1* | 8/2020 | Lu | ........................... H02M 1/10 |

FOREIGN PATENT DOCUMENTS

| | | |
|---|---|---|
| CN | 103561993 B | 3/2016 |
| CN | 103944434 B | 6/2016 |
| DE | 102012203073 A1 | 8/2013 |
| EP | 2290799 A1 | 8/2009 |
| EP | 2148417 A1 | 1/2010 |
| WO | 2019116722 A1 | 6/2019 |

* cited by examiner

*Primary Examiner* — Jared Fureman
*Assistant Examiner* — Esayas G Yeshaw
(74) *Attorney, Agent, or Firm* — Kirton McConkie; Evan R. Witt

(57) ABSTRACT

A cascaded conversion system and a voltage equalizing control method thereof are provided. The cascaded conversion system includes a plurality of conversion circuits connected in cascade. Each conversion circuit includes a DC-side capacitor, a switching unit and a control unit. The DC-side capacitors of the conversion circuits are electrically connected in series. In each conversion circuit, the switching unit is connected to the DC-side capacitor in parallel and includes a plurality of bridge arms. Each bridge arm includes a first switch and a second switch. The control unit controls the switches according to the voltage across the DC-side capacitor. The control unit controls the first and second switches to be turned on alternately. All the first switches are turned on and off simultaneously, and all the second switches are turned on and off simultaneously, thereby making the voltages across the DC-side capacitors of the conversion circuits equal.

21 Claims, 11 Drawing Sheets

S1: In each conversion circuit, a driving signal including a switching frequency is generated according to the voltage across the DC-side capacitor.

S2: The first and second switches are controlled to be turned on alternately according to the driving signal, all the first switches are turned on and off simultaneously, and all the second switches are turned on and off simultaneously, thereby making the voltages across the DC-side capacitors of all the conversion circuits substantially equal.

FIG. 11

CASCADED CONVERSION SYSTEM AND VOLTAGE EQUALIZING CONTROL METHOD THEREOF

CROSS-REFERENCE TO RELATED APPLICATION

This application claims priority to China Patent Application No. 202010995551.1, filed on Sep. 21, 2020. The entire contents of the above-mentioned patent applications are incorporated herein by reference for all purposes.

FIELD OF THE INVENTION

The present disclosure relates to a conversion system and a control method thereof, and more particularly to a cascaded conversion system and a voltage equalizing control method thereof.

BACKGROUND OF THE INVENTION

In the application of high-voltage DC-DC conversion, the structure of plural DC-DC power modules connected in series is often adopted. Usually, the DC-side cascaded converter is designed with modularization, and in each power module, an auxiliary power supply and one or more power conversion circuits are disposed, which can realize self power supply inside the power module. However, the auxiliary power supply cannot realize the voltage equalization by itself. Accordingly, during the startup process or the standby state of the conversion system, it necessary to take additional measures to equalize the input voltage for preventing the components from being broken.

Conventionally, the high-power winding resistor and the high-voltage DC relay are utilized to form a discharge circuit, so as to adjust the voltage by discharging the high-voltage DC bus. Further, a resistor is connected to the DC bus in parallel to realize the equalization of the input voltage. However, the existence of the discharge circuit and the parallel resistor results in a large volume and high cost. Furthermore, it is necessary to strengthen the insulation for the driving circuit of the relay, which also occupies a large space.

Therefore, there is a need of providing a cascaded conversion system and a voltage equalizing control method thereof to obviate the drawbacks encountered from the prior arts.

SUMMARY OF THE INVENTION

In accordance with an aspect of the present disclosure, there is provided a cascaded conversion system including a plurality of conversion circuits electrically connected in cascade. Each of the plurality of conversion circuits includes a DC-side capacitor, a switching unit and a control unit. The DC-side capacitors of the plurality of conversion circuits are electrically connected in series. In each of the plurality of conversion circuits, the switching unit is electrically connected to the DC-side capacitor in parallel, the switching unit includes a plurality of bridge arms, and each of the plurality of bridge arms includes a first switch and a second switch. The control unit is coupled to the switching unit and the DC-side capacitor. The control unit is configured to output a driving signal having a switching frequency according to a voltage across the DC-side capacitor for controlling on and off of the switches of the switching unit. In each of the plurality of conversion circuits, the control unit controls the first switch and the second switch to be turned on alternately with the switching frequency according to the driving signal. In the plurality of bridge arms, all the first switches are turned on and off simultaneously, all the second switches are turned on and off simultaneously, thereby making the voltages across the DC-side capacitors of the plurality of conversion circuits equal.

In accordance with another aspect of the present disclosure, there is further provided a voltage equalizing control method configured to control a cascaded conversion system. The cascaded conversion system includes a plurality of conversion circuits electrically connected in cascade. Each of the plurality of conversion circuits includes a DC-side capacitor and a switching unit. The DC-side capacitors of the plurality of conversion circuits are electrically connected in series. The switching unit is electrically connected to the DC-side capacitor in parallel and includes a plurality of bridge arms. Each of the plurality of bridge arms includes a first switch and a second switch. The voltage equalizing control method includes: (a) in each of the plurality of conversion circuits, generating a driving signal having a switching frequency according to a voltage across the DC-side capacitor; and (b) controlling the first switch and the second switch to be turned on alternately with the switching frequency according to the driving signal, controlling all the first switches to be turned on and off simultaneously, and controlling all the second switches to be turned on and off simultaneously, thereby making the voltages across the DC-side capacitors of the plurality of conversion circuits to be equal.

BRIEF DESCRIPTION OF THE DRAWINGS

FIG. 11 is a schematic flow chart illustrating a voltage equalizing control method according to an embodiment of the present disclosure.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
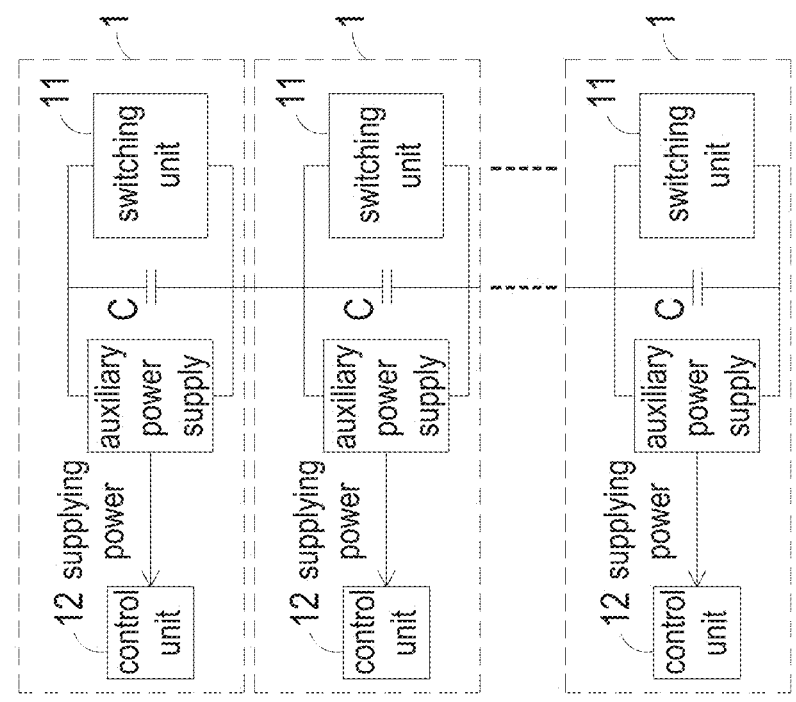
FIG. 1 is a schematic circuit diagram illustrating a DC-side circuit of a cascaded conversion system according to an embodiment of the present disclosure.

FIG. 1 is a schematic circuit diagram illustrating a DC-side circuit of a cascaded conversion system according to an embodiment of the present disclosure. The cascaded conversion system of the present disclosure can be a DC-DC conversion system or a DC-AC conversion system. As shown in FIG. 1, a DC side of the cascaded conversion system includes a plurality of conversion circuits 1 electrically connected in cascade. Each of the plurality of conversion circuits 1 includes a DC-side capacitor C, a switching unit 11 and a control unit 12. The plural DC-side capacitors C of the plurality of conversion circuits 1 are electrically connected in series. In each of the plurality of conversion circuits 1, the switching unit 11 is electrically connected to the DC-side capacitor C in parallel and includes a plurality of bridge arms, and each of the plurality of bridge arms includes a first switch and a second switch. The control unit 12 is coupled to the switching unit 11 and the DC-side capacitor C. The control unit 12 is configured to output a driving signal having a switching frequency according to a voltage across the DC-side capacitor C, and the on and off of switches of the switching unit 11 is controlled through the driving signal. In each of the plurality of conversion circuits 1, according to the driving signal, the control unit 12 controls the first and second switches of the switching unit 11 to be turned on alternately with the switching frequency. In addition, in each conversion circuit 1, all the first switches are turned on and off simultaneously, and all the second switches are turned on and off simultaneously. Consequently, the voltages across the DC-side capacitors C of all the conversion circuits 1 are substantially equal, thereby realizing the voltage equalization. In an embodiment, in each of the plurality of conversion circuits 1, the control unit 12 compares the voltage across the DC-side capacitor C with a reference voltage. Under the circumstance that the conversion circuit 1 works in a first state, if the voltage across the DC-side capacitor C deviates from the reference voltage, the driving signal and the switching frequency are adjusted according to the above comparison result so as to make the voltage across the DC-side capacitor C approach the reference voltage. Besides, all the conversion circuits 1 are corresponding to the same reference voltage. The reference voltage may be equal to an input voltage received by the cascaded conversion system divided by the number of the conversion circuits 1. Alternatively, the reference voltage may be equal to an average value of the voltages across the DC-side capacitors C of all the conversion circuits 1. In an embodiment, each of the plurality of conversion circuits 1 further includes an auxiliary power supply. The auxiliary power supply takes power from the DC-side capacitor C and supplies power for the control unit 12.

In this embodiment, the conversion circuit working in the first state means that the conversion circuit will not output power. That is to say, the output power of the conversion circuit is extremely small or is even none. The first state is for example but not limited to a standby state (with a voltage at input and no voltage at output), a no-load state (with voltages at input and output and no load at output) and an extremely light-load state (with voltages at input and output and extremely small load at output).

In the present disclosure, based on the principle that switching loss consumes electrical power, the voltages across the DC-side capacitors C of the conversion circuits 1 are adjusted through controlling the switching frequencies of the conversion circuits 1 respectively. Accordingly, the voltages across the DC-side capacitors C of all the conversion circuits 1 are adjusted to be substantially the same, thereby realizing the input voltage equalization. Therefore, the cost and the volume occupied by the circuit for realizing the input voltage equalization can be greatly reduced.

In an embodiment, in each conversion circuit 1, the conversion circuit 1 has a rated input voltage, there is a potential point between the first and second switches of each bridge arm, and the voltage between the potential points of every two bridge arms are [0, 30%] times the rated input voltage.

Figure 2:
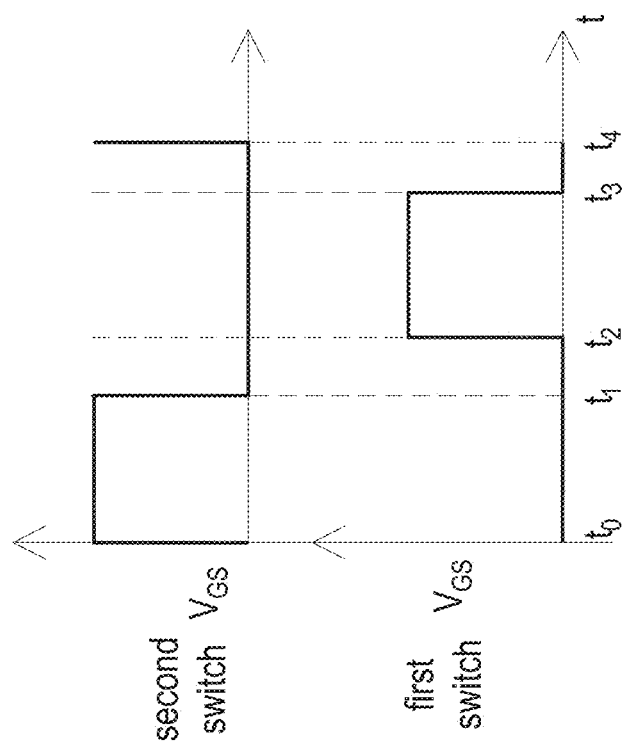
FIG. 2 is a schematic view showing a switching sequence of a first switch and a second switch according to an embodiment of the present disclosure.
Figure 3:
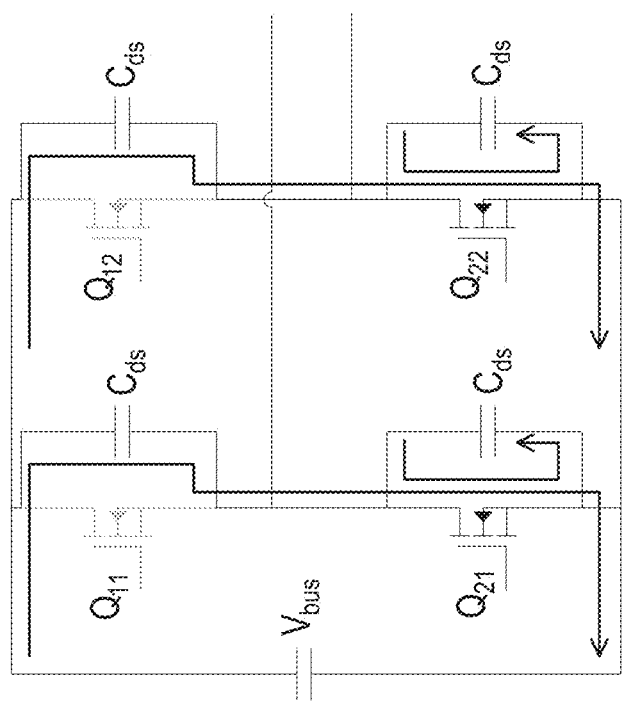
FIG. 3 and FIG. 4 are schematic views illustrating an on-off state of the switching units at different time according to an embodiment of the present disclosure.
Figure 4:
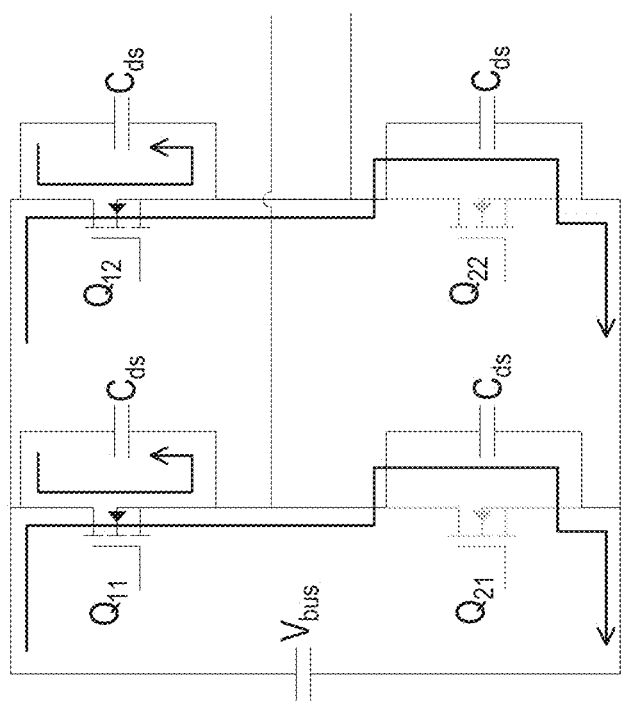

FIG. 2 is a schematic view showing a switching sequence of a first switch and a second switch according to an embodiment of the present disclosure. FIG. 3 and FIG. 4 are schematic views illustrating an on-off state of switching units at different timing according to an embodiment of the present disclosure. As shown in FIG. 2, in each of the plurality of conversion circuits 1, the first switch and the second switch are turned on alternately. For example, during the period from time $t_0$ to time $t_1$, the gate-source voltage $V_{GS}$ of the first switch is at a low level (i.e., the first switch is at the off state), and the gate-source voltage $V_{GS}$ of the second switch is at a high level (i.e., the second switch is at the on state). During the period from time $t_2$ to time $t_3$, the gate-source voltage $V_{GS}$ of the first switch is at a high level (i.e., the first switch is at the on state), and the gate-source voltage $V_{GS}$ of the second switch is at a low level (i.e., the second switch is at the off state). In the embodiments shown in FIG. 3 and FIG. 4, the switching unit 11 includes two bridge arms electrically connected in parallel, and each of the two bridge arms is electrically connected to the DC-side capacitor C in parallel. One of the two bridge arms includes a first switch $Q_{11}$ and a second switch $Q_{21}$ electrically connected in series, and the other bridge arm includes a first switch $Q_{12}$ and a second switch $Q_{22}$ electrically connected in series. A drain and a source of each switch are connected to two terminals of a junction capacitor $C_{ds}$. According to the switching sequence shown in FIG. 2, during the period from time $t_0$ to time $t_1$, as shown in FIG. 3, the first switches $Q_{11}$ and $Q_{12}$ are at the off state (depicted in a lighter line), and the second switches $Q_{21}$ and $Q_{22}$ are at the on state. During the period from time $t_2$ to time $t_3$, as shown in FIG. 4, the first switches $Q_{11}$ and $Q_{12}$ are at the on state, and the second switches $Q_{21}$ and $Q_{22}$ are at the off state (depicted in a lighter line). When the bridge arm is commutating (i.e., the switch is turned on or off), the junction capacitor $C_{ds}$ of the switches is charged and discharged repeatedly. During the charging and the discharging process, the energy of the junction capacitor $C_{ds}$ of the switches is consumed as switching loss, and the switching loss consumes the energy of the corresponding DC-side capacitor C. Therefore, the amount of the switching loss can be varied by adjusting the switching frequency of the driving signal, and further the energy of the DC-side capacitor C is affected. The higher the switching frequency is, the larger the switching loss is.

Figure 5:
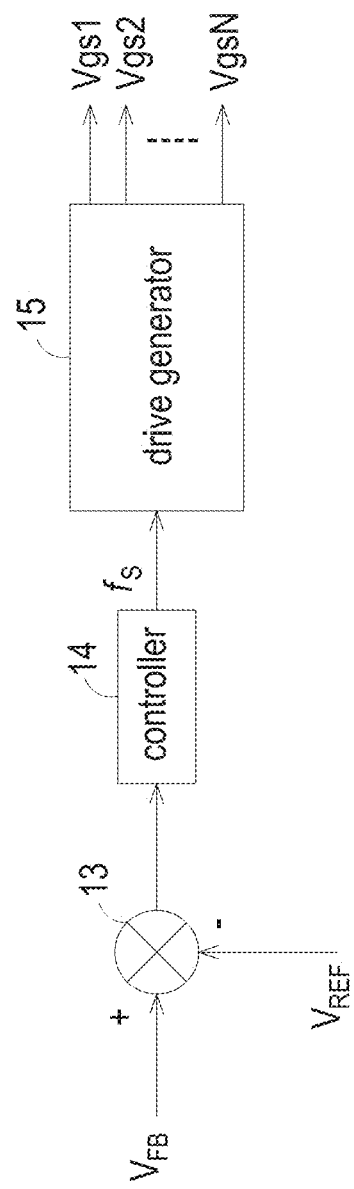
FIG. 5 is a schematic circuit diagram illustrating a control unit according to an embodiment of the present disclosure.
Figure 6:
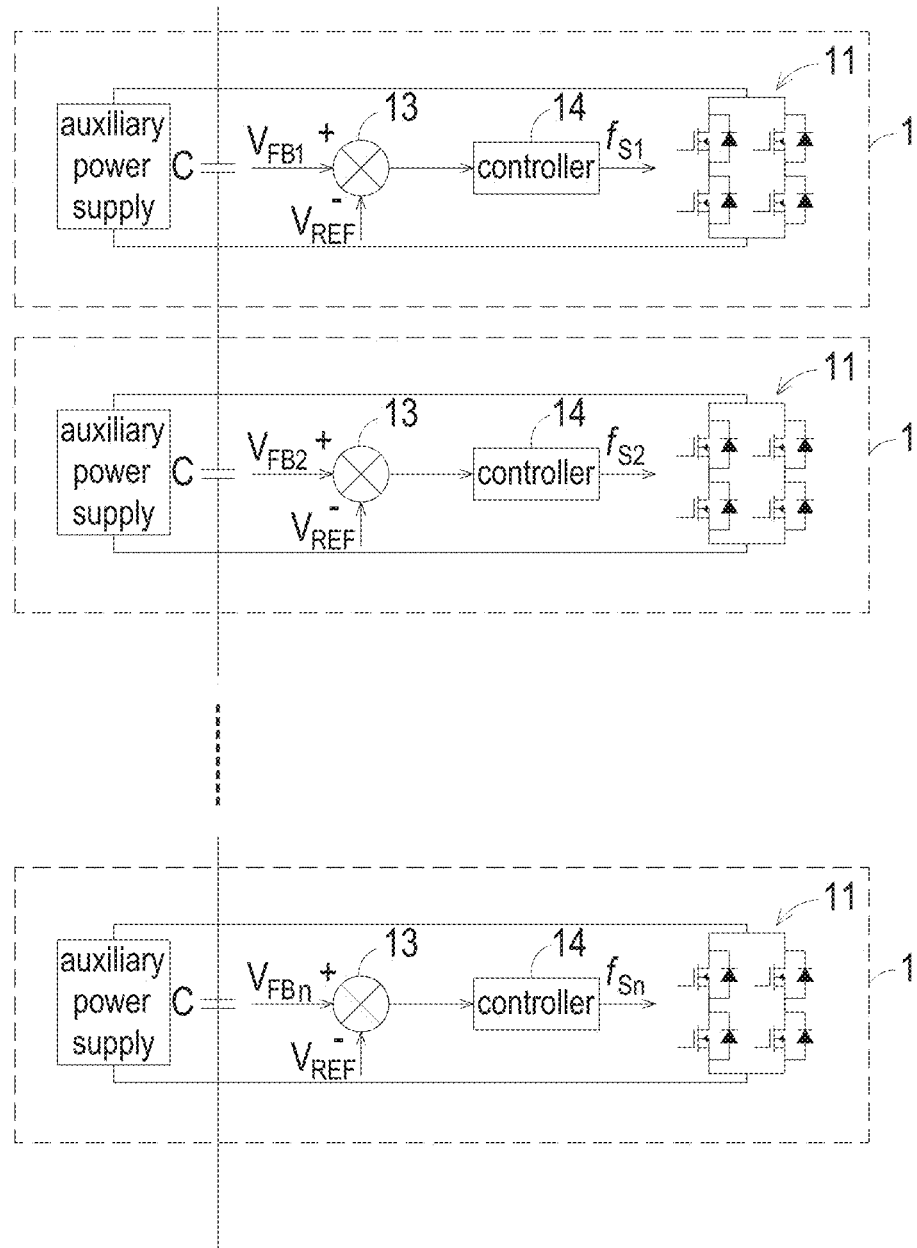
FIG. 6 is a schematic circuit diagram illustrating the control unit of FIG. 5 being applied in a cascaded conversion system.

FIG. 5 is a schematic circuit diagram illustrating a control unit according to an embodiment of the present disclosure. In an embodiment, as shown in FIG. 5, the control unit 12 includes a comparator 13, a controller 14 and a drive generator 15 connected in sequence. The comparator 13 receives and compares the reference voltage $V_{REF}$ with the voltage $V_{FB}$ of the DC-side capacitor C, and the comparator 13 outputs a comparison result to the controller 14. The controller 14 outputs a switching frequency $f_S$ to the drive generator 15 according to the comparison result. The drive generator 15 outputs a plurality of driving signals Vgs1, Vgs2, . . . , VgsN according to the switching frequency $f_S$ for driving the plural switches of the corresponding switching unit 11 respectively, where N equals the number of the switches. The driving signals of all the first switches are the same, and the driving signals of all the second switches are the same. Further, in all the conversion circuits 1, the reference voltage $V_{REF}$ are the same. The voltages across the DC-side capacitors C of the conversion circuits 1 are different, and thus the corresponding switching frequencies are different as well. For example, as shown in FIG. 6, in the first conversion circuit 1, according to the comparison result of the reference voltage $V_{REF}$ and the voltage $V_{FB1}$ across the DC-side capacitor C, the controller 14 outputs a switching frequency $f_{S1}$ to control the switches of the corresponding switching unit 11. Therefore, through changing the switching loss, the voltage $V_{FB1}$ across the DC-side capacitor C is controlled to be equal or substantially equal to the reference voltage $V_{REF}$. In the second conversion circuit 1, according to the comparison result of the reference voltage $V_{REF}$ and the voltage $V_{FB2}$ across the DC-side capacitor C, the controller 14 outputs a switching frequency $f_{S2}$ to control the switches of the corresponding switching unit 11. Therefore, through changing the switching loss, the voltage $V_{FB2}$ across the DC-side capacitor C is controlled to be equal to or substantially equal to the reference voltage $V_{REF}$. Similarly, in the (n)th conversion circuit 1, according to the comparison result of the reference voltage $V_{REF}$ and the voltage $V_{FBn}$ across the DC-side capacitor, the controller 14 outputs a switching frequency $f_{S_n}$ to control the switches of the corresponding switching unit 11. Through changing the switching loss, the voltage $V_{FBn}$ across the DC-side capacitor C is controlled to be equal or substantially equal to the reference voltage $V_{REF}$. Since the voltages across the DC-side capacitors C are equal or substantially equal to the reference voltage $V_{REF}$, the input voltage equalization is realized.

The implementation of the switching unit is not limited to the embodiments shown in FIG. 3 and FIG. 4. The switching unit may include a plurality of bridge arms electrically connected in series or in parallel. Various possible implementations of the switching unit are exemplified as follows, but the actual implementation of the switching unit is not limited thereto. The control unit corresponding to the switching unit can be referred to FIG. 5 and FIG. 6, and the detailed descriptions thereof are omitted herein.

Figure 7:
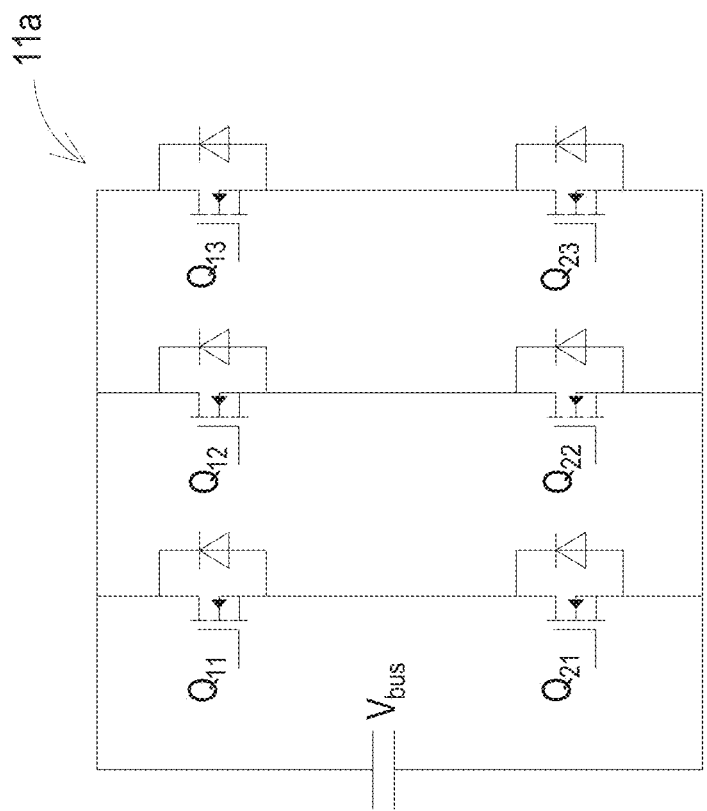
FIG. 7, FIG. 8 and FIG. 9 are schematic circuit diagrams showing different variants of the switching unit of FIG. 1.

In an embodiment, the switching unit includes a plurality of bridge arms electrically connected in parallel, and each of the plurality of bridge arms is electrically connected to the DC-side capacitor C in parallel and includes a first switch and a second switch electrically connected in series. For example, as shown in FIG. 7, the switching unit 11a includes three bridge arms electrically connected in parallel. The first bridge arm includes a first switch $Q_{11}$ and a second switch $Q_{21}$ electrically connected in series. The second bridge arm includes a first switch $Q_{12}$ and a second switch $Q_{22}$ electrically connected in series. The third bridge arm includes a first switch $Q_{13}$ and a second switch $Q_{23}$ electrically connected in series.

Figure 8:
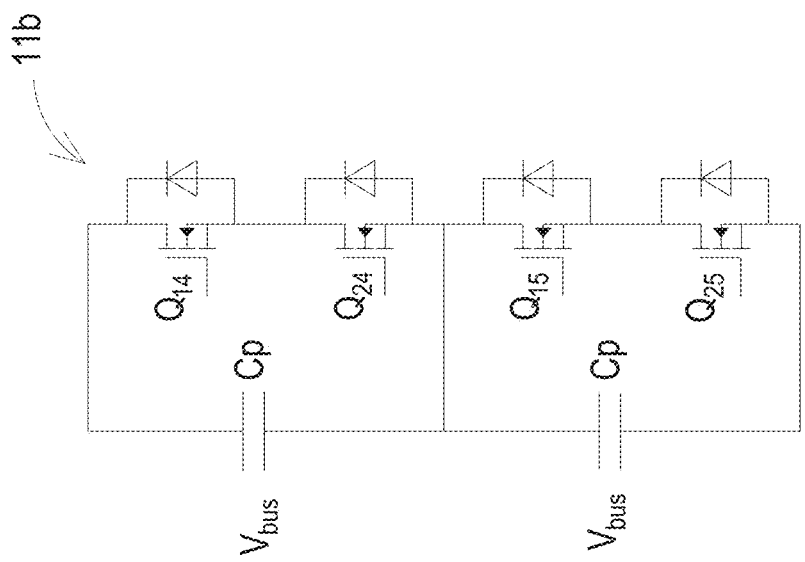

In an embodiment, the switching unit includes a plurality of bridge arms electrically connected in series, and each of the plurality of bridge arms includes a first switch and a second switch electrically connected in series. For example, as shown in FIG. 8, the switching unit 11b includes two bridge arms connected in series. Each of the plurality of bridge arms is connected to a capacitor Cp in parallel, and the capacitors Cp corresponding to the plurality of bridge arms respectively are connected in series to form a DC side of the switching unit 11b. The DC side formed by the capacitors Cp connected in series is electrically connected to the DC-side capacitor C in parallel. The first bridge arm includes a first switch $Q_{14}$ and a second switch $Q_{24}$ electrically connected in series. The second bridge arm includes a first switch $Q_{15}$ and a second switch $Q_{25}$ connected in series. The first switch $Q_{14}$, the second switch $Q_{24}$, the first switch $Q_{15}$ and the second switch $Q_{25}$ are serially connected in sequence. The second switch $Q_{24}$ and the first switch $Q_{15}$ are electrically connected to the midpoint between the two capacitors Cp.

Figure 9:
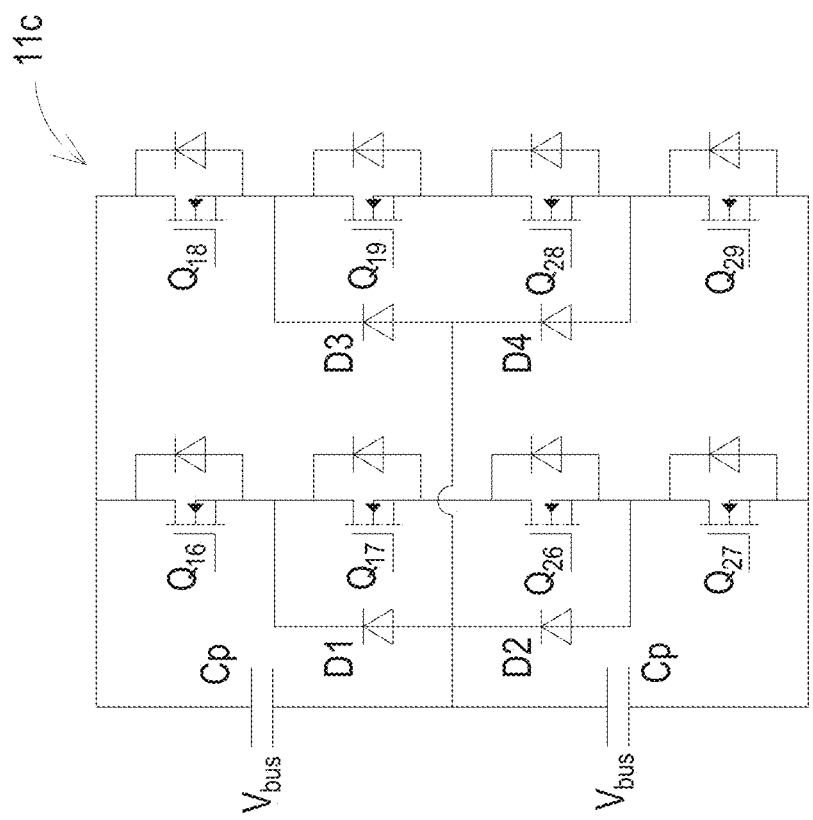

In an embodiment, the switching unit includes a plurality of bridge arms connected in parallel, and each of the plurality of bridge arms includes two first switches and two second switches serially connected in sequence. Moreover, each of the plurality of bridge arms further includes a first diode and a second diode. A cathode of the first diode is electrically connected between the two first switches, an anode of the first diode is electrically connected to a cathode of the second diode, and an anode of the second diode is electrically connected between the two second switches. For example, as shown in FIG. 9, the switching unit 11c includes two bridge arms electrically connected in parallel and two capacitors Cp. The two capacitors Cp are electrically connected in series to form a DC side of the switching unit 11c, which is connected to the DC-side capacitor in parallel. The first bridge arm includes two first switches $Q_{16}$ and $Q_{17}$, two second switches $Q_{26}$ and $Q_{27}$, a first diode D1 and a second diode D2. The second bridge arm includes two first switches $Q_{18}$ and $Q_{19}$, two second switcher $Q_{28}$ and $Q_{29}$, a first diode D3 and a second diode D4. In the first bridge arm, the two first switches $Q_{16}$ and $Q_{17}$ and the two second switches $Q_{26}$ and $Q_{27}$ are connected in series between the input terminals. The cathode of the first diode D1 is electrically connected between the two first switches $Q_{16}$ and $Q_{17}$, and the anode of the first diode D1 is electrically connected to the cathode of the second diode D2 and a midpoint of the two capacitors Cp. The anode of the second diode D2 is electrically connected between the two second switches $Q_{26}$ and $Q_{27}$. In the second bridge arm, the two first switches $Q_{18}$ and $Q_{19}$ and the two second switches $Q_{28}$ and $Q_{29}$ are connected in series between input terminals. The cathode of the first diode D3 is electrically connected between the two first switches $Q_{18}$ and $Q_{19}$, and the anode of the first diode D3 is electrically connected to the cathode of the second diode D4 and a midpoint of the two capacitors. An anode of the second diode D4 is electrically connected between the two second switches $Q_{28}$ and $Q_{29}$.

Figure 10:
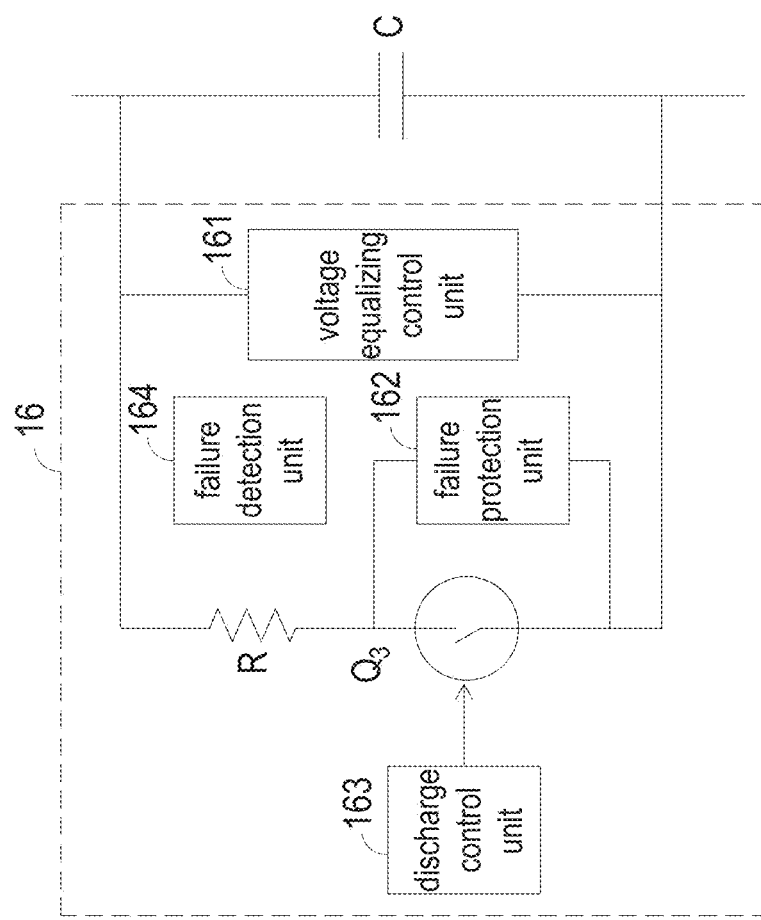
FIG. 10 is a schematic circuit diagram illustrating a discharging circuit according to an embodiment of the present disclosure.

Moreover, in addition to the aforementioned method of actively controlling the switching frequency for realizing the voltage equalization (active voltage equalizing), the cascaded conversion system of the present disclosure can also realize the voltage equalization through discharging the DC-side capacitor C in a passive manner. For example, the DC-side capacitor C may be discharged by a resistor. In an embodiment, as shown in FIG. 10, in each of the plurality of conversion circuits 1, the conversion circuit 1 further includes a discharging circuit 16. The discharging circuit 16 includes a resistor R and a third switch $Q_3$, and the discharging circuit 16 is electrically connected to two terminals of the DC-side capacitor C in parallel. When the third switch $Q_3$ is turned on, the third switch $Q_3$ and the resistor R discharge the DC-side capacitor C.

In an embodiment, the discharging circuit 16 further includes a voltage equalizing control unit 161 coupled to the DC-side capacitor C and the third switch $Q_3$. The voltage equalizing control unit 161 controls the on and off of the third switch $Q_3$ according to the voltage across the DC-side capacitor C. Specifically, when the voltage across the DC-side capacitor C is larger than the reference voltage, the voltage equalizing control unit 161 controls the third switch $Q_3$ to be on. When the conversion circuit works in the above-mentioned active voltage equalizing state, the voltage equalizing control unit 161 controls the third switch $Q_3$ to be off.

In an embodiment, the discharging circuit 16 further includes a failure protection unit 162, and the failure protection unit 162 is connected to the third switch $Q_3$ in parallel. When the voltage equalizing control unit 161 or the third switch $Q_3$ fails and breaks down, the failure protection unit 162 and the resistor R discharge the DC-side capacitor C if the voltage across the DC-side capacitor C is larger than a failure voltage. The failure voltage represents the maximum voltage that the switches in the conversion circuit 1 are able to withstand. The DC-side capacitor C is set to be discharged when the voltage across the DC-side capacitor C is larger than the failure voltage, thus every component in the conversion circuit 1 can be protected from being damaged by overvoltage.

In an embodiment, the discharging circuit 16 further includes a discharge control unit 163 connected to the third switch $Q_3$. The discharge control unit 163 controls the third switch $Q_3$ to be on when the cascaded conversion system works in a shutdown state so as to discharge the DC-side capacitor through the third switch $Q_3$ and the resistor R. When a bus voltage of the cascaded conversion system is lower than a preset undervoltage protection value, or when the cascaded conversion system receives a shutdown command, the cascaded conversion system works in the shutdown state.

In an embodiment, the discharging circuit 16 further includes a failure detection unit 164. The failure detection unit 164 is connected to the resistor R and detects the status of the resistor R (e.g., voltage, current, temperature, etc.) so as to determine whether the resistor R is overheated. The failure detection unit 164 warns when the resistor R is determined to be overheated.

FIG. 11 is a schematic flow chart illustrating a voltage equalizing control method according to an embodiment of the present disclosure. The voltage equalizing control method is configured to control the cascaded conversion system of the above embodiments. As shown in FIG. 11, the voltage equalizing control method includes steps S1 and S2. In the step S1, in each conversion circuit 1, a driving signal including a switching frequency is generated according to the voltage across the DC-side capacitor C. In the step S2, the first switch and the second switch are controlled to be turned on alternately according to the driving signal, all the first switches are turned on and off simultaneously, and all the second switches are turned on and off simultaneously, thereby making the voltages across the DC-side capacitors C of all the conversion circuits 1 substantially equal.

In an embodiment, the voltage equalizing control method further includes a step of comparing the voltage across the DC-side capacitor with the reference voltage. In the case that the voltage across the DC-side capacitor C deviates from the reference voltage, the driving signal and the switching frequency are adjusted according to the comparison result when the conversion circuit 1 works in the first state.

In this embodiment, the conversion circuit working in the first state means that the conversion circuit cannot output power, that is to say, the output power is extremely small or is even none. The first state is for example but not limited to a standby state (with a voltage at input and no voltage at output), a no-load state (with voltages at input and output and no load at output) and an extremely light-load state (with voltages at input and output and extremely small load at output).

Under the circumstance that the conversion circuit includes the discharging circuit, in an embodiment, the voltage equalizing control method further includes steps of:

when the voltage across the DC-side capacitor C being larger than the reference voltage, or when the cascaded conversion system working in the shutdown state, turning on the third switch $Q_3$, thereby discharging the DC-side capacitor C by the third switch $Q_3$ and the resistor R; and when the conversion circuit working in the above-mentioned active voltage equalizing state, turning off the third switch $Q_3$.

In an embodiment, the voltage equalizing control method further includes a step of: when the voltage across the DC-side capacitor C being larger than the failure voltage, utilizing the failure protection unit 162 connected to the third switch $Q_3$ in parallel and the resistor R to discharge the DC-side capacitor C.

From the above descriptions, the present disclosure provides a cascaded conversion system and a voltage equalizing control method thereof. The cascaded conversion system includes a plurality of conversion circuits electrically connected in cascade. Based on the principle that switching loss consumes electric power, the voltages across the capacitors of the plurality of conversion circuit can be adjusted through controlling the switching frequencies of the conversion circuits respectively. Accordingly, the voltages across the capacitors of all the conversion circuits can be adjusted to be equal, thereby equalizing the input voltage. Therefore, the cost and the occupied volume for realizing the input voltage equalization can be greatly reduced.

While the disclosure has been described in terms of what is presently considered to be the most practical and preferred embodiments, it is to be understood that the disclosure needs not be limited to the disclosed embodiment.

What is claimed is:

1. A cascaded conversion system, comprising:
a plurality of conversion circuits electrically connected in cascade, wherein each of the plurality of conversion circuits comprises:
a DC-side capacitor, wherein the DC-side capacitors of the plurality of conversion circuits are electrically connected in series;
a switching unit electrically connected to the DC-side capacitor in parallel and comprising a plurality of bridge arms, wherein each of the plurality of bridge arms comprises a first switch and a second switch; and
a control unit coupled to the switching unit and the DC-side capacitor, wherein the control unit is configured to output a driving signal having a switching frequency according to a voltage across the DC-side capacitor for controlling on and off of the switches of the switching unit;
wherein in each of the plurality of conversion circuits, the control unit controls the first switch and the second switch to be turned on alternately with the switching frequency according to the driving signal, and wherein in the plurality of bridge arms, all the first switches are turned on and off simultaneously, all the second switches are turned on and off simultaneously, thereby making the voltages across the DC-side capacitors of the plurality of conversion circuits equal.

2. The cascaded conversion system according to claim 1, wherein in each of the plurality of conversion circuits, the conversion circuit has a rated input voltage, there is a potential point between the first switch and the second switch of each of the plurality of bridge arms, and the voltage between the potential points of every two of the plurality of bridge arms is [0, 30%] times the rated input voltage.

3. The cascaded conversion system according to claim 1, wherein the plurality of bridge arms in each switching unit are electrically connected in parallel, and the first switch and the second switch in each of the plurality of bridge arms are electrically connected in series.

4. The cascaded conversion system according to claim 1, wherein the plurality of bridge arms in each switching unit are electrically connected in series, and the first switch and the second switch in each of the plurality of bridge arms are electrically connected in series.

5. The cascaded conversion system according to claim 1, wherein the plurality of bridge arms in each switching unit are electrically connected in parallel, each of the plurality of bridge arms comprises two first switches and two second switches serially connected in sequence, each of the plurality of bridge arms further comprises a first diode and a second diode, a cathode of the first diode is electrically connected between the two first switches, an anode of the first diode is electrically connected to a cathode of the second diode, and an anode of the second diode is electrically connected between the two second switches.

6. The cascaded conversion system according to claim 1, wherein in each of the plurality of conversion circuits, the control unit compares the voltage across the DC-side capacitor with a reference voltage to obtain a comparison result, and the control circuit adjusts the driving signal and the switching frequency according to the comparison result when the conversion circuit is in a first state.

7. The cascaded conversion system according to claim 6, wherein the first state is a standby state, a no-load state or an extremely light-load state.

8. The cascaded conversion system according to claim 6, wherein the reference voltage equals an input voltage received by the cascaded conversion system divided by the number of the conversion circuits.

9. The cascaded conversion system according to claim 6, wherein the reference voltage equals an average value of the voltages across the DC-side capacitors of the plurality of conversion circuits.

10. The cascaded conversion system according to claim 6, wherein in each of the plurality of conversion circuits, the control unit comprises a comparator, a controller and a drive generator connected in sequence, the comparator receives and compares the reference voltage with the voltage across the DC-side capacitor, the comparator outputs the comparison result to the controller, the controller outputs the switching frequency to the drive generator according to the comparison result, and the drive generator outputs a plurality of driving signals according to the switching frequency for driving the switches in the switching unit respectively.

11. The cascaded conversion system according to claim 1, wherein in each of the plurality of conversion circuits, the conversion circuit further comprises a discharging circuit, the discharging circuit comprises a resistor and a third switch, the discharging circuit is electrically connected to two terminals of the DC-side capacitor in parallel, and the third switch and the resistor discharge the DC-side capacitor when the third switch is turned on.

12. The cascaded conversion system according to claim 11, wherein in each of the plurality of conversion circuits, the discharging circuit further comprises a voltage equalizing control unit coupled to the DC-side capacitor and the third switch, the voltage equalizing control unit controls the third switch to be turned on when the voltage across the DC-side capacitor is larger than a reference voltage, wherein when all the first switches are turned on and off simultaneously, and all the second switches are turned on and off simultaneously, the voltage equalizing control unit controls the third switch to be turned off.

13. The cascaded conversion system according to claim 12, wherein in each of the plurality of conversion circuits, the discharging circuit further comprises a failure protection unit electrically connected to the third switch in parallel, and the failure protection unit and the resistor discharge the DC-side capacitor when the voltage across the DC-side capacitor is larger than a failure voltage.

14. The cascaded conversion system according to claim 11, wherein in each of the plurality of conversion circuits, the discharging circuit further comprises a discharging control unit connected to the third switch, and the discharging control unit controls the third switch to be turned on when the cascaded conversion system works in a shutdown state so as to discharge the DC-side capacitor through the third switch and the resistor.

15. A voltage equalizing control method configured to control a cascaded conversion system, the cascaded conversion system comprising a plurality of conversion circuits electrically connected in cascade, each of the plurality of conversion circuits comprising a DC-side capacitor and a switching unit, the DC-side capacitors of the plurality of conversion circuits being electrically connected in series, the switching unit being electrically connected to the DC-side capacitor in parallel and comprising a plurality of bridge arms, each of the plurality of bridge arms comprising a first switch and a second switch, the voltage equalizing control method comprising:
(a) in each of the plurality of conversion circuits, generating a driving signal having a switching frequency according to a voltage across the DC-side capacitor; and
(b) controlling the first switch and the second switch to be turned on alternately with the switching frequency according to the driving signal, controlling all the first switches to be turned on and off simultaneously, and controlling all the second switches to be turned on and off simultaneously, thereby making the voltages across the DC-side capacitors of the plurality of conversion circuits equal.

16. The voltage equalizing control method according to claim 15, further comprising: comparing the voltage across the DC-side capacitor with a reference voltage to obtain a comparison result, and adjusting the driving signal and the switching frequency according to the comparison result when the conversion circuit being in a first state.

17. The voltage equalizing control method according to claim 16, wherein the first state is a standby state, a no-load state or an extremely light-load state.

18. The voltage equalizing control method according to claim 16, wherein the reference voltage equals an input voltage received by the cascaded conversion system divided by the number of the conversion circuits.

19. The voltage equalizing control method according to claim 16, wherein the reference voltage equals an average value of the voltages across the DC-side capacitors of the plurality of conversion circuits.

20. The voltage equalizing control method according to claim 15, wherein in each of the plurality of conversion circuits, the conversion circuit further comprises a discharging circuit comprising a resistor and a third switch, the discharging circuit is electrically connected to two terminals of the DC-side capacitor in parallel, the voltage equalizing control method further comprising:
- when the voltage across the DC-side capacitor being larger than a reference voltage, or when the cascaded conversion system working in a shutdown state, turning on the third switch for discharging the DC-side capacitor through the third switch and the resistor; and
- when all the first switches being turned on and off simultaneously, and all the second switches being turned on and off simultaneously, turning off the third switch.

21. The voltage equalizing control method according to claim 20, further comprising: when the voltage across the DC-side capacitor being larger than a failure voltage, utilizing a failure protection unit electrically connected to the third switch in parallel and the resistor to discharge the DC-side capacitor.

* * * * *